(12) United States Patent
Nefzger et al.

(10) Patent No.: US 7,951,896 B2
(45) Date of Patent: May 31, 2011

(54) PROCESS FOR THE PRODUCTION OF NCO PREPOLYMERS THAT ARE STABLE TO SEDIMENTATION, AND THEIR USE

(75) Inventors: Hartmut Nefzger, Pulheim (DE); Manfred Schmidt, Dormagen (DE); James-Michael Barnes, Breitscheid (DE); Ernst Felske, Neuss (DE); Jens Krause, Cologne (DE)

(73) Assignee: Bayer MaterialScience AG, Leverkusen (DE)

( * ) Notice: Subject to any disclaimer, the term of this patent is extended or adjusted under 35 U.S.C. 154(b) by 1197 days.

(21) Appl. No.: 11/480,596

(22) Filed: Jul. 3, 2006

(65) Prior Publication Data

US 2007/0010643 A1     Jan. 11, 2007

(30) Foreign Application Priority Data

Jul. 8, 2005  (DE) .......................... 10 2005 031 977

(51) Int. Cl.
*C08G 18/00* (2006.01)

(52) U.S. Cl. ......................................... 528/85; 528/196

(58) Field of Classification Search .................... 528/85, 528/196
See application file for complete search history.

(56) References Cited

U.S. PATENT DOCUMENTS

| 3,904,796 | A | * | 9/1975 | Zorn et al. ................. 427/389.9 |
| 4,808,691 | A | | 2/1989 | Konig et al. ..................... 528/76 |
| 5,310,822 | A | | 5/1994 | Kielhorn-Bayer et al. ... 525/399 |
| 6,977,290 | B2 | | 12/2005 | Nefzger et al. ................. 528/85 |
| 2002/0123595 | A1 | * | 9/2002 | Tanaka et al. .................. 528/44 |
| 2004/0152861 | A1 | | 8/2004 | Nefzger et al. ................. 528/76 |
| 2005/0143551 | A1 | | 6/2005 | Tanaka et al. .................. 528/44 |

FOREIGN PATENT DOCUMENTS

EP    0 358 555 A2    3/1990

* cited by examiner

*Primary Examiner* — Milton I Cano
*Assistant Examiner* — Michael Leonard
(74) *Attorney, Agent, or Firm* — N. Denise Brown; Lyndanne M. Whalen; Noland J. Cheung

(57) ABSTRACT

The present invention relates to NCO-terminated prepolymers that are stable to sedimentation, to a process for the production of these NCO-terminated prepolymers, and to the production of polyurethanes from these NCO-terminated polymers.

5 Claims, No Drawings

PROCESS FOR THE PRODUCTION OF NCO PREPOLYMERS THAT ARE STABLE TO SEDIMENTATION, AND THEIR USE

CROSS REFERENCE TO RELATED PATENT APPLICATION

The present patent application claims the right of priority under 35 U.S.C. 119 (a)-(d) of German Patent Application No. 10 2005 031 977.9, filed on Jul. 8, 2005.

BACKGROUND OF THE INVENTION

The present invention relates to NCO-terminated prepolymers which are stable to sedimentation, to a process for the production of NCO-terminated prepolymers that are stable to sedimentation, and to their use. These NCO-terminated polymers are based on polyether carbonate polyols.

As known and described in the prior art (U.S. Pat. No. 4,808,691), polyether carbonate polyols based on hexanediol ether are reacted with polyisocyanate in a molar excess, in most cases with 4,4'-diphenylmethane diisocyanate, to give isocyanate prepolymers having terminal NCO groups ("NCO prepolymers" or "NCO-terminated prepolymers"). These NCO-terminated prepolymers are, in turn, important raw materials for the production of polyurethanes and particularly for polyurethane cast elastomers.

Polyether carbonate polyols are predominantly bifunctional, hydroxyl-group-terminated polyols which contain both carbonate groups and ether groups. In accordance with the prior art, polyether carbonate polyols are prepared in a condensation reaction using, for example, diphenyl carbonate or dimethyl carbonate or carbonic acid dichloride, mixtures of ether-group-containing diols, which are prepared by acid catalyzed condensation of diols, and unetherified diols being used.

A disadvantage of the above-mentioned NCO-terminated prepolymers prepared from 4,4'-diphenylmethane diisocyanate and hexanediol ether carbonate polyols is that they form a sediment when stored at room temperature. Increasing the storage temperature to prevent sediment formation is of no help because the viscosity then rises considerably, and as a result, the NCO-terminated prepolymers ultimately become unusable. The same is also true if once cooled and hence sediment-containing NCO-terminated prepolymers are heated again. On further reaction, the precipitate that forms leads to inhomogeneities in the finished casting elastomer, which in turn can be a cause of material failure.

The object of the present invention was, therefore, to produce NCO-terminated prepolymers in a manner such that a precipitate no longer forms, or settles out, during storage of the prepolymer at room temperature.

It has now surprisingly been found that NCO-terminated prepolymers based on polyether carbonate polyols can be so produced such that they are stable to sedimentation if one or more specific polyols are mixed with the polyether carbonate polyol before the reaction with 4,4'-diphenylmethane diisocyanate.

SUMMARY OF THE INVENTION

The present invention provides NCO-terminated prepolymers and a process for the production of NCO-terminated prepolymers that are stable to sedimentation at room temperature. These NCO-terminated prepolymers are based on polyether carbonate polyols and 4,4'-diphenylmethane diisocyanate.

The process for producing the NCO-terminated prepolymers that are stable to sedimentation comprises:

a) mixing (1) at least one polyether carbonate polyol having a molecular weight of from 1000 to 4000 g/mol, with (2) at least one polyol selected from the group consisting of: 1,2-propanediol, 1,3-propanediol, glycerol, 2,3-butanediol, 1,3-butanediol, 2-methyl-1,3-propanediol, 1,2-pentanediol, 1,3-pentanediol, 1,4-pentanediol, 1,5-pentanediol, 2,2-dimethyl-1,3-propanediol, 2-methyl-1,4-butanediol, 2-methyl-1,3-butanediol, 1,1,1-trimethylolethane, 3-methyl-1,5-pentanediol and its structural isomers, 1,1,1-trimethylolpropane, 1,7-heptanediol, 2-ethyl-1,6-hexanediol, 1,9-nonanediol, 1,11-undecanediol, diethylene glycol, triethylene glycol, oligoethylene glycol, 2,2'-thiodiglycol, di- or poly-glycols prepared from 1,2-propylene oxide, propylene glycols, di-, tri- and tetra-butylene glycol, di-, tri- and tetra-hexylene ether glycol, 1,4-cyclohexanediol, 1,3-cyclohexanediol, and the reaction products of one or more of the above-described polyols with ethylene oxide and/or propylene oxide in a molar ratio of from 1:1 to 1:5, and b) subsequently reacting the mixture formed in a) with a stoichiometric excess of (3) 4,4'-diphenylmethane diisocyanate.

The mixture of the polyether carbonate polyol, component (1), and added polyol or polyol mixture, component (2), preferably has a hydroxyl number which is higher than the hydroxyl number of the polyether carbonate polyol by at least 1.5 hydroxyl units, preferably by at least 3 hydroxyl units, and by not more than 15 hydroxyl units.

The NCO-terminated prepolymers of the invention are stable to sedimentation at room temperature. These prepolymers comprise the reaction product of (I) a mixture of (1) at least one polyether carbonate polyol having a molecular weight of from 1000 to 4000 g/mol, with (2) at least one polyol selected from the group consisting of 1,2-propanediol, 1,3-propanediol, glycerol, 2,3-butanediol, 1,3-butanediol, 2-methyl-1,3-propanediol, 1,2-pentanediol, 1,3-pentanediol, 1,4-pentanediol, 1,5-pentanediol, 2,2-dimethyl-1,3-propanediol, 2-methyl-1,4-butanediol, 2-methyl-1,3-butanediol, 1,1,1-trimethylolethane, 3-methyl-1,5-pentanediol and its structural isomers, 1,1,1-trimethylolpropane, 1,7-heptanediol, 2-ethyl-1,6-hexanediol, 1,9-nonanediol, 1,11-undecanediol, diethylene glycol, triethylene glycol, oligoethylene glycol, 2,2'-thiodiglycol, di- or poly-glycols prepared from 1,2-propylene oxide, propylene glycols, di-, tri- and tetra-butylene glycol, di-, tri- and tetra-hexylene ether glycol, 1,4-cyclohexanediol, 1,3-cyclohexanediol, and the reaction products of one or more of the above-described polyols with ethylene oxide and/or propylene oxide in a molar ratio of from 1:1 to 1:5, with a stoichiometric excess of:

(II) 4,4'-diphenylmethane diisocyanate.

DETAILED DESCRIPTION OF THE INVENTION

As used in connection with the invention, the phrase "stable to sedimentation" means that the NCO-terminated prepolymers exhibit no sediment even after storage for three weeks at 23° C.

The one or more polyols which are added to the polyether carbonate polyol in accordance with the present invention are preferably polyols that have not themselves been used in the synthesis of the polyether carbonate polyol. Particular preference is given to polyols containing at least 3 carbon atoms and not more than 32 carbon atoms. The carbon atoms of these polyols can be arranged either in a linear chain, or in branched form, or cycloaliphatically. The carbon chain can also be interrupted by hetero atoms, which are preferably oxygen atoms or sulfur atoms.

The hydroxyl groups of the polyols can preferably be primary or secondary. The polyols suitable for being mixed with the polyether carbonate polyols should contain not more than 4 hydroxyl groups. In addition, the mixture of the one or more polyol and one or more polyether carbonate polyol should have a number-average functionality that is not more than 2.1.

It is, of course, also possible to use mixtures of a plurality of polyols.

Suitable polyols to be used for mixing with the polyether carbonate polyols comprise one or more polyols selected from the group consisting of: 1,2-propanediol, 1,3-propanediol, glycerol, 2,3-butanediol, 1,3-butanediol, 2-methyl-1,3-propanediol, 1,2-pentanediol, 1,3-pentanediol, 1,4-pentanediol, 1,5-pentanedial, 2,2-dimethyl-1,3-propanediol, 2-methyl-1,4-butanediol, 2-methyl-1,3-butanediol, 1,1,1-trimethylolethane, 3-methyl-1,5-pentanediol, 1,1,1-trimethylolpropane, 1,7-heptanediol, 2-ethyl-1,6-hexanediol, 1,9-nonanediol, 1,11-undecanediol, diethylene glycol, triethylene glycol, oligoethylene glycol, 2,2'-thiodiglycol, diglycols or polyglycols prepared from 1,2-propylene oxide, propylene glycols, dibutylene glycol, tributylene glycol, tetrabutylene glycol, dihexylene ether glycol, trihexylene ether glycol, tetrahexylene ether glycol, 1,4-cyclohexanediol, 1,3-cyclohexanediol, and reaction products of one or more of the above-mentioned polyols with ethylene oxide and/or propylene oxide.

Polyether carbonate polyols based on hexanediol and hexanediolether are preferred. The hexanediolether preferably has a molecular weight of 150 to 500 g/mol. The mole ratio of the ether groups to the carbonate groups is preferably 3:1 to 1:3.

In accordance with the process of the present invention, it is preferred that the polyol(s) is added to the polyether carbonate polyol at elevated temperature. This temperature is preferably above the melting point of the polyether carbonate polyol and the melting point of the added polyol(s). However, the temperature should preferably not exceed a value given by the following formula:

$$(ERT-50)*RZ \leq 1500$$

in which:
ERT=the numerical value of the temperature at which the mixture of the polyol and the polyether carbonate polyol is stirred, in [° C.]
and
RZ=numerical value of the stirring time, in minutes.

After the polyols have been introduced into the polyether carbonate polyol, the resulting mixture is cooled to storage temperature or fed to the further reaction with polyisocyanate.

For the production of NCO-terminated prepolymers, the mixture of polyol and polyether carbonate polyol can be reacted in a manner known to the person skilled in the art, for example, with 4,4'-diphenylmethane diisocyanate at elevated temperature. Suitable elevated temperatures are generally in the range from 50 to 100° C., and preferably in the presence of protecting gas, to yield an NCO-terminated prepolymer. The mixtures of polyol and polyether carbonate polyol that are used to prepare the NCO-terminated prepolymers preferably have a hydroxyl number of from 27 to 113 mg KOH/g, and the NCO content of the resulting prepolymers is preferably from 5 to 15 wt. % NCO.

The NCO-terminated prepolymers are suitable for the production of foamed and non-foamed polyurethanes. Polyurethanes are prepared by reacting, in known manner, the NCO-terminated prepolymers of the present invention with at least one isocyanate-reactive component.

The present invention is to be explained in greater detail by means of the following Examples. The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Example 1

Preparation of a Polyether Polyol (Precursor for the Polyether Carbonate Polyol)

In a 300 liter VA vessel having a column and azeotropic attachment, a reflux condenser and a distillate receiver, 240 kg (2069 mol) of molten hexanediol were mixed, with stirring, with 2.5 kg of 35% aqueous 1,5-naphthalenedisulfonic acid and 10 kg of toluene. The temperature was raised to 170° C. 22 kg of water were distilled off over the course of 10 hours under a slight stream of nitrogen. The mixture was cooled to 100° C., evacuation was carried out, and 10 kg of distilled water were drawn in in vacuo. After the contents of the vessel had been cooled to 30° C., 0.908 kg of 32% aqueous sodium hydroxide solution was added, and the mixture was heated to 100° C. over the course of 2 hours. Stirring was continued at 100° C. for one hour; the mixture was cooled to 50° C. and 104 g of concentrated aqueous sodium hydrogen carbonate were added, and thorough stirring was carried out for a further 30 minutes at that temperature. The pH value was 6.4 and the acid number was 0.05 mg KOH/g.

The mixture was then cooled to 30° C. again, and 44 kg of 10% aqueous sodium chloride solution were stirred in intensively. After the stirrer was switched off, the phases separated within a period of about 30 minutes; the lower phase was let off. The product that remained in the vessel was dewatered at 140° C. for 3 hours by application of a vacuum (1 mbar) and cooled to 80° C. Filtration was carried out for 40 minutes over a Seitz filter equipped with a Supra 5500 filter plate. Yield: 190 kg of product.

The water content of the product was 0.02%, the hydroxyl number was 466 mg KOH/g and the acid number was 0.05 mg KOH/g.

Example 2

Preparation of the Polyether Carbonate Polyol 3000 g of polyether polyol based on hexanediol having an OH number of 466, prepared by the process described in Example 1, were reacted with 1107 g of hexanediol and 4157 g of diphenyl carbonate using 150 mg of magnesium carbonate hydroxide pentahydrate (Aldrich). The reaction mixture was thereby heated at 180° C. for one hour, cooled to 120° C., the temperature was raised to 200° C. over the course of 6 hours, with the pressure being 15 mbar at about 120° C. and above. In order to complete the reaction, stirring was then carried out for 2 hours at 200° C. and a pressure of <1 mbar. A total of 3652 g of phenol was distilled off. 175 mg of concentrated sulfuric acid were added in order to neutralise the basic magnesium catalyst. The OH number of the resultant polyether carbonate polyol was 53 mg KOH/g, the acid number was 0.12 mg KOH/g and the viscosity was 1100 mPas (75° C.). Determination of the end groups gave a content of <0.01% for "phenylcarbonato", 0.14% for "phenoxy" and 0.02% for free phenol.

Example 3

Production of an NCO-Terminated Prepolymer that is Stable to Sedimentation (According to the Invention)

2750.5 g of polyether carbonate polyol from Example 2 having a hydroxyl number of 53 mg KOH/g were stirred with 16.6 g of 1,5-pentanediol at 60° C. for 0.5 hour. The mixture was added to 1732.9 g of 4,4'-diphenylmethane diisocyanate which had been preheated to 50° C., and stirring was carried out for 2 hours at 80° C.

The NCO content of the product was determined to be 9.99 wt. % NCO (theory 10.0 wt. %), the viscosity was 1990 mPas (70° C.), and the product was stored at room temperature.

After a storage time of 10 weeks at room temperature, the NCO-terminated prepolymer exhibited no sediment.

Example 4

Production of an NCO-Terminated Prepolymer that is Stable to Sedimentation (According to the Invention)

307.4 g of polyether carbonate polyol from Example 2 having a hydroxyl number of 53 mg KOH/g were stirred with 1.9 g of 3-methyl-1,5-pentanediol at 60° C. for 0.5 hour. The mixture was added to 190.9 g of 4,4'-diphenylmethane diisocyanate which had been preheated to 50° C., and stirring was carried out for 2 hours at 80° C.

The NCO content of the product was determined to be 9.90 wt. % NCO (theory 10.0 wt. %), the viscosity was 2090 mPas (70° C.), and the product was stored at room temperature.

After a storage time of 10 weeks at room temperature, the NCO-terminated prepolymer exhibited no sediment.

Example 5

Production of an NCO Prepolymer that is Stable to Sedimentation (According to the Invention)

307.2 g of polyether carbonate polyol from Example 2 having a hydroxyl number of 53 mg KOH/g were stirred with 1.9 g of neopentyl glycol at 60° C. for 0.5 hour. The mixture was added to 190.9 g of 4,4'-diphenylmethane diisocyanate which had been preheated to 50° C., and stirring was carried out for 2 hours at 80° C.

The NCO content of the product was determined to be 9.91 wt. % NCO (theory 10.0 wt. %), the viscosity was 2170 mPas (70° C.), and the product was stored at room temperature.

After a storage time of 10 weeks at room temperature, the NCO-terminated prepolymer exhibited no sediment.

Example 6

Production of an NCO-Terminated Prepolymer (Comparison)

186.4 g of 4,4'-diphenylmethane diisocyanate were placed under nitrogen at 50° C.; 313.6 g of the polyether carbonate polyol from Example 2 were added thereto and stirring was carried out for 2 hours at 80° C.

The NCO content of the resultant prepolymer was determined to be 9.95 wt. % NCO, the viscosity at 70° C. was 1890 mPas. The product exhibited slight cloudiness directly after its production. After 2 days' storage at room temperature, a further increase in the cloudiness was observed. After 3 weeks' storage at room temperature, the product exhibited a clearly discernible sediment.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of NCO-terminated prepolymers having an NCO group content of 5 to 15% by weight and that are stable to sedimentation at room temperature, which comprises
    a) mixing
        (1) at least one polyether carbonate polyol having a molecular weight of from 1000 to 4000 g/mol,
        with
        (2) at least one polyol from the group consisting of 1,2-propanediol, 1,3-propanediol, glycerol, 2,3-butanediol, 1,3-butanediol, 2-methyl-1,3-propanediol, 1,2-pentanediol, 1,3-pentanediol, 1,4-pentanediol, 1,5-pentanediol, 2,2-dimethyl-1,3-propanediol, 2-methyl-1,4-butanediol, 2-methyl-1,3-butanediol, 1,1,1-trimethylolethane, 3-methyl-1,5-pentanediol and its structural isomers, 1,1,1-trimethylolpropane, 1,7-heptanediol, 2-ethyl-1,6-hexanediol, 1,9-nonanediol, 1,11-undecanediol, diethylene glycol, triethylene glycol, oligoethylene glycol, 2,2'-thiodiglycol, di- or poly-glycols prepared from 1,2-propylene oxide, propylene glycols, di-, tri- and tetra-butylene glycol, di-, tri- and tetra-hexylene ether glycol, 1,4-cyclohexanediol, 1,3-cyclohexanediol, and the reaction products of one or more of these polyols with ethylene oxide and/or propylene oxide in a molar ratio of from 1:1 to 1:5,
        wherein the resultant mixture has a hydroxyl number which is higher than the hydroxyl number of the polyether carbonate polyol by at least 1.5 hydroxyl units and not more than 15 hydroxyl units;
    and
    b) subsequently reacting the mixture from a) with a stoichiometric excess of (3) 4,4'-diphenylmethane diisocyanate.

2. The process of claim 1, wherein (1) said polyether carbonate polyol is based on hexanediol or hexanediolether, and (2) said polyol is selected from the group consisting of 1,5-pentanediol, 3-methyl-1,5-pentanediol and neopentyl glycol.

3. An NCO-terminated prepolymer having an NCO group content of 5 to 15% by weight and that is stable to sedimentation at room temperature, and which comprises the reaction product of:
    (I) a mixture of
        (1) at least one polyether carbonate polyol having a molecular weight of from 1000 to 4000 g/mol,
        and
        (2) at least one polyol from the group consisting of 1,2-propanediol, 1,3-propanediol, glycerol, 2,3-butanediol, 1,3-butanediol, 2-methyl-1,3-propanediol, 1,2-pentanediol, 1,3-pentanediol, 1,4-pentanediol, 1,5-pentanediol, 2,2-dimethyl-1,3-propanediol, 2-methyl-1,4-butanediol, 2-methyl-1,3-butanediol, 1,1,1-trimethylolethane, 3-methyl-1,5-pentanediol and its structural isomers, 1,1,1-trimethylolpropane, 1,7-heptanediol, 2-ethyl-1,6-hexanediol, 1,9-nonanediol, 1,11-undecanediol, diethylene glycol, triethylene glycol, oligoethylene glycol, 2,2'-thiodiglycol, di- or poly-glycols prepared from 1,2-propylene oxide, propylene glycols, di-, tri- and tetra-butylene glycol, di-, tri- and tetra-hexylene ether glycol, 1,4-cyclohexanediol, 1,3-cyclohexanediol, and the reaction products of one or more of these polyols with ethylene oxide and/or propylene oxide in a molar ratio of from 1:1 to 1:5, wherein the resultant mixture has a hydroxyl number which is higher than the hydroxyl number of the polyether carbonate polyol by at least 1.5 hydroxyl units and not more than 15 hydroxyl units;

with (II) a stoichiometric excess of 4,4'-diphenylmethane diisocyanate.

4. A process for the production of polyurethane materials, comprising reacting the NCO-terminated prepolymer of claim 3 with an isocyanate-reactive component.

5. The NCO-terminated prepolymer of claim 3, wherein (1) said polyether carbonate polyol is based on hexanediol or hexanediolether, and (2) said polyol is selected from the group consisting of 1,5-pentanediol, 3-methyl-1,5-pentanediol and neopentyl glycol.

\* \* \* \* \*